(12) United States Patent
Kitchener et al.

(10) Patent No.: US 8,274,774 B2
(45) Date of Patent: Sep. 25, 2012

(54) INTRINSICALLY SAFE COMMUNICATIONS CIRCUIT

(75) Inventors: Renato Kitchener, West Sussex (GB); Gunther Rogoll, Mannheim (DE); Michael Kessler, Mannheim (DE)

(73) Assignee: Pepperl + Fuchs GmbH (DE)

( * ) Notice: Subject to any disclaimer, the term of this patent is extended or adjusted under 35 U.S.C. 154(b) by 501 days.

(21) Appl. No.: 12/601,409

(22) PCT Filed: May 23, 2008

(86) PCT No.: PCT/GB2008/001763
§ 371 (c)(1),
(2), (4) Date: Nov. 23, 2009

(87) PCT Pub. No.: WO2008/142421
PCT Pub. Date: Nov. 27, 2008

(65) Prior Publication Data
US 2010/0195255 A1    Aug. 5, 2010

(30) Foreign Application Priority Data
May 23, 2007    (GB) .................................. 0709824.7

(51) Int. Cl.
*H02H 1/00*    (2006.01)
(52) U.S. Cl. ........................................ 361/119
(58) Field of Classification Search .................... 361/119
See application file for complete search history.

(56) References Cited

U.S. PATENT DOCUMENTS

| | | |
|---|---|---|
| 5,835,534 A | 11/1998 | Kogure |
| 2005/0068710 A1 | 3/2005 | Burr et al. |
| 2005/0220180 A1* | 10/2005 | Barlev et al. ................. 375/222 |
| 2006/0209847 A1* | 9/2006 | Binder ........................ 370/400 |
| 2006/0218418 A1 | 9/2006 | Camagna et al. |
| 2007/0110026 A1* | 5/2007 | Sinha et al. .................. 370/351 |
| 2009/0180226 A1* | 7/2009 | Rogoll et al. ................. 361/79 |
| 2010/0195255 A1* | 8/2010 | Kitchener et al. ............ 361/46 |
| 2010/0303138 A1* | 12/2010 | Kitchener et al. ........... 375/224 |

FOREIGN PATENT DOCUMENTS
EP    1883179 A1    1/2008

OTHER PUBLICATIONS

International Search Report, PCT/GB2008/001763, dated Sep. 18, 2009.

* cited by examiner

*Primary Examiner* — Ronald W Leja
(74) *Attorney, Agent, or Firm* — Lerner, David, Littenberg, Krumholz & Mentlik, LLP

(57) ABSTRACT

An electrical circuit comprising a power supply, a load, a pair of parallel positive cables between the power supply and the load, a pair of parallel negative cables between the load and the power supply, and incendive arc prevention means, comprising: monitoring means adapted to detect if the current and/or voltage in one of the pair of cables deviates from the other, and a control means adapted to fully or partially isolate the power supply from the pair of cables if the monitoring means detects that their current and/or voltage has deviated from the other, characterised in which: the electrical circuit comprises a common positive section between the power supply and the pair of positive cables, and a common negative section between the pair of negative cables and the power supply, in which a first modulation means is adapted to generate a modulated communications signal.

26 Claims, 1 Drawing Sheet

INTRINSICALLY SAFE COMMUNICATIONS CIRCUIT

CROSS REFERENCE TO RELATED APPLICATIONS

The present application is a national phase entry under 35 U.S.C. §371 of International Application No. PCT/GB2008, 001763, filed May 23, 2008, published in English, which claims the benefit of Great Britain Patent Application No. 0709824.7, filed May 23, 2007. The disclosures of said applications are incorporated by reference herein.

This invention relates to an Intrinsically Safe communications circuit for use particularly, but not exclusively in combustible atmospheres, and in particular gas group classification IIC, Hydrogen and Acetylene, and below, for example gas group IIB and IIA, for gas and/or dust.

Field instruments and equipment in an Intrinsically Safe environment are controlled remotely via an electrical communications circuit. Traditionally communications have been provided in the same electrical circuit as the power to drive the field instruments. WO2006/003445 in the name of the applicant discloses a modern version of such a construction, in which signalling is passed along a two wire Fieldbus segment.

However, newer technologies, such as Ethernet, provide the possibility of having separate communications circuits bundled together with power circuits. This provides greater flexibility and communications speed, which allows for more modern and sophisticated equipment to be used in the field.

Ethernet was not designed for use in an Intrinsically Safe environment, however WO2007/088387 in the name of the applicant discloses an incendive arc prevention system for use with powered Ethernet cables, which allows for just such specialised usage. WO 2007/129031, also in the name of the applicant discloses a further invention which allows for Ethernet signals to be used in an Intrinsically Safe environment.

However, both of these earlier cases only relate to rendering Ethernet power cables or Ethernet signal cables intrinsically safe, and they do not disclose any manner in which Ethernet style cabling can be used for both power and communication at the same time. Such a combination circuit would provide even greater flexibility and capacity.

In particular, in WO2007/088387 is specific to power distribution, and discloses an incendive arc prevention means adapted to monitor a pair of positive cables and a pair of negative cables, and to detect if the current and/or voltage in one of the pair of positive cables deviates from the other, and if the current and/or voltage in one of the pair of negative cables deviates from the other. If this occurs then a control means isolates the power supply from the cabling. If conventional signaling were applied to one of the pairs of positive or negative cables then it would lead to a deviation in the current and/or voltage and the power supply would be isolated. It would be very difficult indeed to provide separate but identical signals to both the pair of positive cables and the pair of negative cables which would be so similar that the incendive arc prevention means would not react.

WO 2007/129031 relates to the conversion of electrical data signals to optical signals, and transmitting those signals over an electrical isolation gap to an intrinsically safe media converter. Clearly, it is not possible to render a power circuit intrinsically safe in this way.

The present invention is intended to overcome some of the above problems.

Therefore, according to the present invention an electrical circuit comprises a power supply, a load, a pair of parallel positive cables between the power supply and the load, a pair of parallel negative cables between the load and the power supply, and incendive arc prevention means, in which the incendive arc prevention means comprises monitoring means adapted to monitor the pair of positive cables and the pair of negative cables, and to detect if the current and/or voltage in one of the pair of positive cables deviates from the other, and if the current and/or voltage in one of the pair of negative cables deviates from the other, and in which the incendive arc prevention means comprises a control means adapted to fully or partially isolate the power supply from the pair of positive cables and the pair of negative cables if the monitoring means detects that the current and/or voltage of one of the pair of positive cables has deviated from the other, or if the current and/or voltage of one of the pair of negative cables has deviated from the other, characterised in which: the electrical circuit comprises a common positive section between the power supply and the pair of positive cables, and a common negative section between the pair of negative cables and the power supply, in which a first modulation means is provided in the common positive section or the common negative section, in which impedance means is provided between the power supply and the first modulation means, and in which the first modulation means is adapted to generate a modulated communications signal.

Therefore, the present invention provides an intrinsically safe electrical circuit like that described in WO2007/088387, but in which a communications signal can be sent down the pair of positive cables without tripping the incendive arc prevention means. The communication signal is ignored by the monitoring means because the net effect is a common mode influence similar to a load variation.

The first modulation means modulates the power at the power supply end of the circuit, either in the common positive or negative section, or across them, and the generated modulation effects both of the pair of positive cables, and both of the pair of negative cables, in exactly the same way, and as such there is no divergence which would trip the incendive arc prevention means.

Therefore the present invention provides a communication system which can be high in transmission current and/or voltage and/or speed and/or type, and certainly much higher than that afforded by the electrical circuit disclosed in WO2007/088387.

The electrical circuit of the invention benefits from the expedient incendive arc prevention arrangement of WO2007/088387, which utilises the four cables to discern the difference between a load attachment or variation and a fault with the potential to be an incendive arc. A load attachment or variation will affect both cables of a pair in the same way, while a fault will not, and therefore load influences can be ignored, and only cable faults considered.

In addition, as the incendive arc prevention means operates on the principal of detecting a difference between active cables, as opposed to just monitoring a single cable at one point, it can rely on a relative measurement between the cables to discern faults, rather than relying on an absolute measurement. As such, the electrical circuit can be made far more sensitive to potential incendive fault measurements, yet use higher quiescent or line currents.

Furthermore, the four wire system has intrinsic protection because should one polarity line make or break, then the other same polarity line will demand the major portion of the total current, because it will be of a lower resistance than the broken line, effectively starving the fault of most if not all of the incendive energy. This is the essence of bi-pinning utilised for non arcing connection in increased safety applications within Zone one or equivalent environments.

In a preferred construction the electrical circuit can comprise a load end common positive section between the pair of positive cables and the load, and a load end common negative section between the load and the pair of negative cables. A second modulation means can be provided in the load end common positive section or the load end common negative section, which can be adapted to demodulate said modulated communications signal. As such, the modulated signal can be received in the field and used accordingly.

The second modulation means can be adapted to generate a return modulated communications signal, and the first modulation means can be adapted to demodulate said return modulated communications signal. Therefore, the first and second modulation means function essentially as "modems" which can communicate with one another.

The electrical circuit can be adapted to carry any type of analogue or digital signal, for example Ethernet, Power over Ethernet (PoE), Fieldbus, HART or Modbus and so on. However, in a preferred embodiment the communications signals can be DSL signals, and the first modulation means and the second modulation means can communicate with one another according to the DSL protocol. The signals can be ADSL, SDSL, or any other variant.

The electrical circuit can be provided with media converters adapted to convert the signals carried over the circuit into other media as required, and to convert incoming signals from other media to that used by the electrical circuit. In particular, the media converters can be adapted to convert signals to or from any kind of analogue or digital communications signals for example Ethernet, Power over Ethernet (PoE), Fieldbus, Radio, 4-20 mA digital I/O, HART, RTD, T/C, Strain Gauge, Modbus or Optical.

It will be appreciated that the electrical circuit of the invention can be used as an intrinsically safe communications circuit only, which basically uses the invention of WO2007/088387 to provide intrinsic safety. In such a version of the invention the second modulation means would comprise the load.

However, in a preferred application the electrical circuit of the invention is used for power distribution and communications, in which case the load can comprise one or more field devices, and the electrical circuit can provide power for said one or more field devices.

In terms of allowing for modulation of the power the impedance means can by provided in the common positive section, or in the common negative section. However, in a preferred embodiment the impedance means can comprise a first impedance means in the common positive section, and a second impedance means in the common negative section. As such, the electrical circuit will be balanced.

The first impedance means and the second impedance means can comprise balanced inductive reactors.

It will be appreciated that the first and second modulation means can be any component which can modulate the power in either the common positive or negative section at the power supply end, and in either the load end common positive or negative section, respectively. This could be achieved with an inductive coupling to an isolation reactor functioning as a lone impedance means.

However, in a preferred construction the first and second modulation means can comprise capacitor coupled modulators mounted across the circuit between the common positive section and the common negative section, and between the load end common positive section and the load end common negative section, respectively. As an alternative, the modulators could be transformer coupled.

In one version of the invention the pair of positive cables can be formed into a first twisted pair, the pair of negative cables can be formed into a second twisted pair, and the first twisted pair and the second twisted pair can be bundled together in the same outer cable. Alternatively, a first positive cable and a first negative cable can be formed into a first twisted pair, a second positive cable and a second negative cable can be formed into a second twisted pair, and the first twisted pair and the second twisted pair can be bundled together in the same outer cable.

As referred to above, the incendive arc prevention means of the invention can be the same as that disclosed in WO2007/088387.

Therefore, the monitoring means can comprise inductive reactors situated at both ends of each of the pair of positive cables, and at both ends of each of the pair of negative cables. The two inductive reactors at a first end of the pair of positive cables can share a first common core, and the two inductive reactors at a first end of the pair of negative cables can share a second common core. The two inductive reactors at a second end of the pair of positive cables can share a third common core, and the two inductive reactors at a second end of the pair of negative cables can share a fourth common core.

These pairs of inductive reactors can be wound around their common cores in opposite directions, so as not to magnetize the cores in normal use.

Therefore, the incendive arc prevention means relies on the magnetization of common inductive reactor cores to detect a divergence in the cables. The common cores will be held in a demagnetized state when the current and/or voltage in the cables remains equal, but it will immediately become magnetized as soon as there is any divergence, and this magnetization can be detected by sensor coils wound round the four common cores.

This arrangement also functions to provide the electrical circuit with current compensation.

The sensor coils can be fed to processors which can be adapted to isolate the power supply or the load when a fault is detected. However, in an alternative to this, the first sensor coil and the second sensor coil can be fed to window comparators adapted to drive a first isolation means adapted to fully or partially isolate the power supply from the pair of positive cables and the pair of negative cables if signals are received from the first sensor coil or the second sensor coil. Likewise, the third sensor coil and the fourth sensor coil can be fed to window comparators adapted to drive a second isolation means adapted to fully or partially isolate the load from the first pair of positive cables and the first pair of negative cables if signals are received from the third sensor coil or the fourth sensor coil.

The first and second isolation means can comprise simple series elements, or they can comprise shunt elements, which provide certain power dumping advantages. Alternatively both can be used.

All the inductive reactors described above can be provided with resistive shunts.

One additional advantage of incorporating modulated communications signals into a circuit with incendive arc prevention means like that described above, is that progressive faults can also be detected. If one of the pairs of cables develops a progressive fault this will be detected by the sensor coils when the power through the cables is modulated. Progressive faults are not normally considered in the field of intrinsic safety because power matching could be exceeded.

However, the electrical circuit of the present invention is capable of detecting such faults. In one version of the invention the processors can be adapted to trigger an alarm if a progressive type fault is detected, before isolating the power supply, or the load, if the fault develops beyond a pre-determined threshold. As such an alarm will sound in advance of a failure, which provides additional safety. In order for this to be effective the communication would have to be continuous or regular.

There are several other ways that the pairs of cables can be monitored in order to detect a difference occurring between them. For example, in one embodiment of the invention the monitoring means can be adapted to separately monitor the current and/or voltage in both the positive cables and both the negative cables in order to discern if the current and/or the voltage of one of the first pair of positive cables, or one of the first pair of negative cables, deviates from the other. Such separate monitoring can be achieved with reactors in the known way.

As an alternative to this arrangement, the monitoring means can be adapted to separately monitor the current and/or voltage in one of the positive cables, in one of the negative cables, and in at least one of the common positive section, the common negative section, the load end common positive section or the load end common negative section. The control means can then be adapted to fully or partially isolate the power supply from the pair of positive cables and the pair of negative cables if the current and/or voltage in the one positive cable or the one negative cable deviates from substantially half the current and/or voltage in the common positive section, the common negative section, the load end common positive section or the load end common negative section, whichever is monitored. This arrangement reduces the number of monitoring points required to three.

In these versions of the invention each of the pair of positive Gables can be provided with a diode at its load end, and each of the pair of negative cables can be provided with a diode at its load end. This arrangement prevents reverse current injection from any inductive and/or capacitive load or other energy storing load, which effectively isolates each line from each other for detection purposes.

In a preferred construction the electrical circuit can be provided with a control means which is adapted to re-connect the power supply to the cables a pre-determined time after it has been isolated therefrom in use. This arrangement allows an event in the circuit to be identified in safety. In particular, the control means can isolate the power supply from the cables as soon as any event is detected, then discern the nature of the event when the power is reconnected. If the current measurement in each line exhibits a common mode or equal rate of change indicative of a load demand or balanced charging components, then the power remains connected, however, should the current change be unbalanced, which would be indicative of a cable fault, then the power will be isolated again. This process can repeat cyclically until the cable fault has been cleared.

In terms of diagnosing the fault, the modulated communications signals can be used to monitor the state of the cables before the power supply is re-connected. This is a further advantage of introducing a communications element to the electrical circuit disclosed in WO2007/088387.

One problematic area to be considered is where connectors are used to couple the cable to a field device. At disconnection, two circuits may be disconnected at the same time, which may lead to two simultaneous incendive arcs, exhibiting the same resistive characteristics. Should this be the case, then the two arcs could be misinterpreted as a common load change, and therefore, the power supply will not be safely isolated.

To avoid this occurrence there are many solutions, but in one version of the invention the pair of positive cables and/or the pair of negative cables can be provided with a connector at one end comprising two pins, one for each cable, and the two pins can be different lengths. With this arrangement, upon disconnection/connection there will always be an unbalance indicative of a fault, and as such the control means will react or shutdown until both the pins have made and all faults are cleared. This technique can comprise differing solutions, for example there may be an interlock that when removed/applied disrupts one of the lines to invoke a power supply shutdown and so on.

As in WO2007/088387 the electrical circuit can be used with one or more second pairs of parallel positive cables between the power supply and the load, and one or more second pairs of parallel negative cables between the load and the power supply. In such constructions the monitoring means can be adapted to monitor all the cables and isolate them as necessary in use.

In one version of the invention if the monitoring means detects that the current and/or voltage of one of any of the pairs of cables deviates from the other, the control means can fully or partially isolate the power supply from that pair of cables and its corresponding opposite polarity pair of cables only. As such, if a fault occurs in the primary power cables of an Ethernet cable, then the power can be maintained to the signal/phantom power cables, and visa versa. Alternatively, the control mean can fully or partially isolate the power supply from all the cables.

In one version of the invention the electrical circuit can be provided with a connector comprising pins from two or more positive cables and two or more negative cables, and the pins from the two or more positive cables can be grouped together, and the pins from the two or more negative cables can be grouped together. Such an arrangement reduces the possibility of incendive arcing because no incendive arc can form between pins of the same polarity.

The invention will now be described by way of example and with reference to the accompanying drawings in which.

Figure 1:
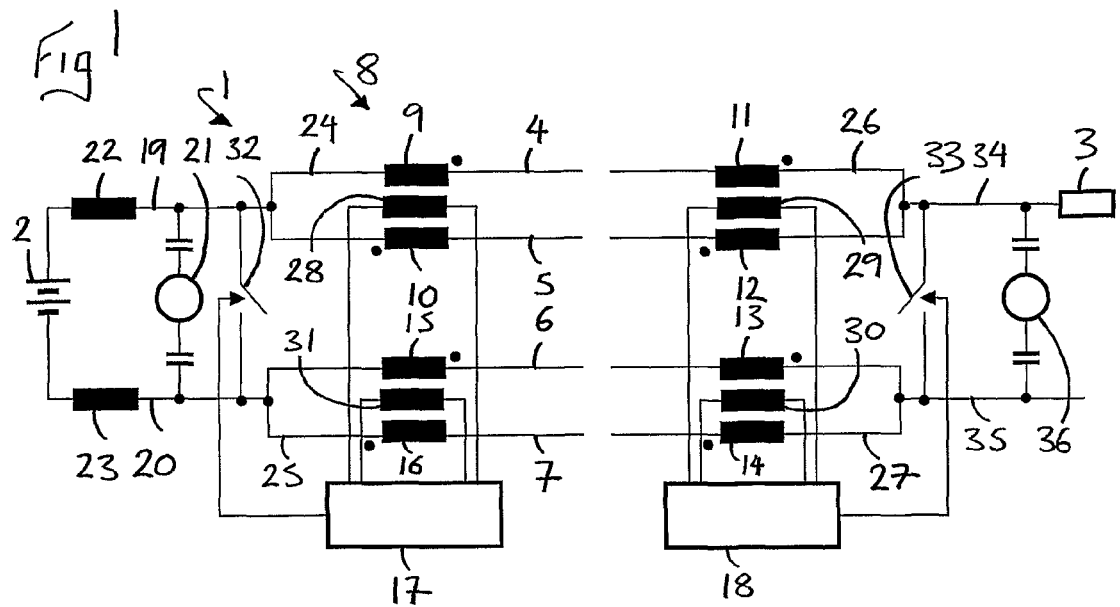
FIG. 1 is a diagrammatic view of an electrical circuit according to the present invention.

As shown in FIG. 1 an electrical circuit 1 comprises a power supply 2, a load 3, a pair of parallel positive cables 4 and 5 between the power supply 2 and the load 3, a pair of parallel negative cables 6 and 7 between the load 3 and the power supply 2, and incendive arc prevention means, generally designated 8.

As described further below, the incendive arc prevention means 8 comprises monitoring means, in the form of inductive reactors 9, 10, 11, 12, 13, 14, 15 and 16 situated at both ends of each of the pair of positive cables 4 and 5, and at both ends of each of the pair of negative cables 6 and 7. The monitoring means 9-16 is adapted to monitor the pair of positive cables 4 and 5 and the pair of negative cables 6 and 7, and to detect if the current and/or voltage in one of the pair of positive cables 4 or 5 deviates from the other, and if the current and/or voltage in one of the pair of negative cables 6 or 7 deviates from the other.

The incendive arc prevention means 8 comprises a control means, in the form of processors 17 and 18, which are adapted to fully or partially isolate the power supply 2 from the pair of positive cables 4 and 5 and the pair of negative cables 6 and 7 if the monitoring means 9-16 detects that the current and/or voltage of one of the pair of positive cables 4 or 5 has deviated from the other, or if the current and/or voltage of one of the pair of negative cables 6 or 7 has deviated from the other.

Thus far the electrical circuit 1 is the same as that disclosed in WO2007/088387. However, the electrical circuit 1 also comprises a common positive section 19 between the power supply 2 and the pair of positive cables 4 and 5, and a common negative section 20 between the pair of negative cables 6 and 7 and the power supply 2. A first modulation means, in the form of capacitor coupled modulator 21, is provided across the electrical circuit 1 between the common positive section 19 and the common negative section 20. Impedance means, in the form of inductive reactors 22 and 23, is provided between the power supply 2 and the first modulation means 21, and the first modulation means 21 is adapted to generate a modulated communications signal.

The two inductive reactors 9 and 10 at a first end 24 of the pair of positive cables 4 and 5 share a first common core (not shown), and the two inductive reactors 15 and 16 at a first end 25 of the pair of negative cables 6 and 7 share a second common core (not shown). The two inductive reactors 11 and 12 at a second end 26 of the pair of positive cables 4 and 5 share a third common core (not shown), and the two inductive reactors 13 and 14 at a second end 27 of the pair of negative cables 6 and 7 share a fourth common core.

As illustrated in FIG. 1 these pairs of inductive reactors 9 and 10, 11 and 12, 13 and 14 and 15 and 16 are wound around their common cores in opposite directions, so as not to magnetize the cores in normal use. As such, the common cores are held in a demagnetized state when the current and/or voltage in the cables 4 and 5 and 6 and 7 remains equal, but they will immediately become magnetized as soon as there is any divergence, and this magnetization is detected by sensor coils 28, 29, 30 and 31 wound round the four common cores.

The sensor coils 28 and 31 are connected to the processor 17, and if signals are received which are indicative of a fault, the processor 17 isolates the power supply 2 from the cables 4-7 by means of shunt switch 32. Likewise, the sensor coils 29 and 30 are connected to the processor 18, and if signals are received which are indicative of a fault, the processor 18 isolates the load 3 from the cables 4-7 by means of shunt switch 33. All the inductive reactors 9-16 are provided with resistive shunts (not shown).

The power source 2 is provided with further components (not shown) to make it 'intrinsically safe' isolated, to provide intrinsic safety against events which would not be provided for by the incendive arc prevention means 8, for example a short circuit to ground. Such further components are known. (In addition to this, it is also possible to voltage and/or current restrict the power source 2 to provide further safety. Such considerations would be tailored to suit the application.)

Therefore, the incendive arc prevention means 8 works in the same way as that described in WO2007/088387. There are various alternative embodiments of incendive arc prevention means described in that patent application which could also find application here, but as they are disclosed in that document they are not further described here in great detail. However, WO200/088387 is included herein in its entirety by reference, to the extent that any feature disclosed therein could be incorporated into any of the Claims below during prosecution of the present application.

The electrical circuit 1 also comprises a load end common positive section 34 between the pair of positive cables 4 and 5 and the load 3, and a load end common negative section 35 between the load 3 and the pair of negative cables 6 and 7. A second capacitor coupled modulator 36 is provided across the electrical circuit 1 between the load end common positive section 34 and the load end common negative section 35.

The first and second modulators 21 and 36 have modem functionality, and as such they can both generate modulated signals for sending across the electrical circuit 1 to the other, and demodulate such signals when they are received. The modulators 21 and 33 send DSL signals to one another. It will be appreciated that the modulators 21 and 33 can also send and receive other types of signals if desired, for example Ethernet, Power over Ethernet (PoE), Fieldbus, HART or Modbus and so on.

The modulators 21 and 36 are provided with media converters (not shown) which are adapted to convert the DSL signals carried over the electrical circuit 1 into other media as required, and to convert incoming signals from other media to DSL. In particular, the media converters can be adapted to convert signals to or from any kind of analogue or digital communications signals for example Ethernet, Power over Ethernet (PoE), Fieldbus, Radio, 4-20 mA digital I/O, HART, RTD, TX, Strain Gauge, Modbus or Optical, whatever is required in any particular installation.

As such, the modulators 21 and 36 can be connected to any type of control devices and field devices respectively, according to their required communications medium. A PC or the like can be connected to the first modulator 21 for sending control or monitoring signals from a control room environment at the power supply end of the circuit 1, out to instruments in the field at the load end of the circuit 1. The second modulator 36 can be connected to field devices, like the load 3, so received control signals can be provided thereto, and monitoring data can be received therefrom for sending back to the first modulator 21.

The modulation of the power is possible because the low impedance power source 2 is isolated for communication by the balanced inductive reactors 22 and 23.

The electrical circuit 1 is for power distribution and communications. Only one load 3 is shown for illustrative purposes, but it will be appreciated how in practice this can be many field devices arranged in any configuration of repeated cables or spurs, in any of the known ways. Although, the number of field devices and their type directly connected to the electrical circuit 1 for power and communications will be limited by the power distribution and communications capacity of the electrical circuit 1.

(Additional power sources or communications sources can be provided to increase the flexibility. In addition, the electrical circuit 1 can be provided with additional redundant circuits, intrinsically safe circuits and/or known protection circuits, such as back e.m.f. protection diodes and resistors, if deemed necessary.)

As the modulators 21 and 33 send DSL signals to one another the electrical circuit 1 can be regarded as one which allows for high power to be sent over broadband, although the electrical circuit 1 uses bespoke high power capacity cables and not telephone cables. (It is possible for the present invention to be used with telephone cable in a classic DLS configuration, but this can only deliver a few watts over a long length of cable so it would have limited power capability. In such a configuration external field power may be provided.)

Therefore, the electrical circuit 1 is an intrinsically safe power distribution circuit like that described in WO2007/088387, but in which communications signals can be sent down the cables 4-7 without tripping the incendive arc prevention means 8. The communications signals are not detected by the sensor coils 28-31 because they are entirely common mode to all the pairs of inductive reactors 9 and 10, 11 and 12, 13 and 14 and 15 and 16, and as such the common cores are never magnetized by any deviation in the current or voltage between the pairs. Using modulators in this way effectively renders the pairs of cables 4 and 5 and 6 and 7 single cables.

In addition, the use of the modulated communications signals means that progressive faults can also be detected, and action taken. If one of the pairs of positive cables 4 or 5, or one of the pairs of negative cables 6 or 7 develops a progressive fault this will be detected by the sensor coils 28-31 when the power through the cables 4-7 is modulated, because there will be a detectable imbalance.

The processors 17 and 18 are provided with an alarm function which activates if any signals are received from the sensor coils 28-31 which are indicative of a slight unbalance brought on by a progressive fault. If the signals from the sensor coils 28-31 are indicative of a serious progressive fault, in other words if the fault develops beyond a pre-determined threshold, then the processors 17 and 18 will isolate the power supply 2 or the load 3 respectively. As such an alarm will sound in advance of a failure, which provides additional safety. In order for this to be effective the modulated communications signals would have to be continuous or regular.

The electrical circuit 1 is advantageous over known arrangements because four cables are used for communication and power, which provides a lower resistance path to current, and which allows for similar/uniform conductor sizes instead of hybrid type cable, like that used for high power or Power over Ethernet, which is limited in cable length, and is more expensive to produce.

Figure 2:
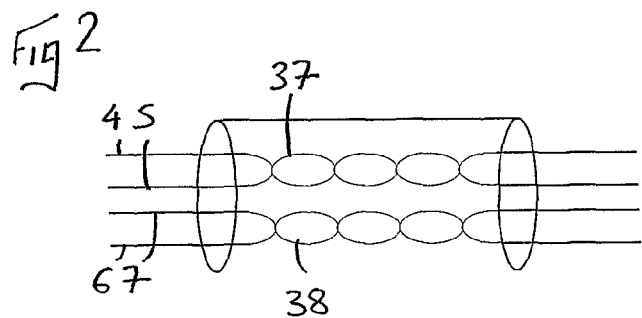
FIG. 2 is a diagrammatic view of a first cable arrangement as used with the electrical circuit of the present invention.

The pairs of parallel cables 4 and 5 and 6 and 7 can be bundled together in use in different ways, and it has no real impact on the functionality described above. For example, FIG. 2 shows the pair of positive cables 4 and 5 formed into a first twisted pair 37, and the pair of negative cables 6 and 7 formed into a second twisted pair 38. As an alternative to this, FIG. 3 shows the first positive cable 4 and the first negative cable 6 formed into a first twisted pair 39, and the second positive cable 5 and the second negative cable 7 formed into a second twisted pair 40.

Figure 3:
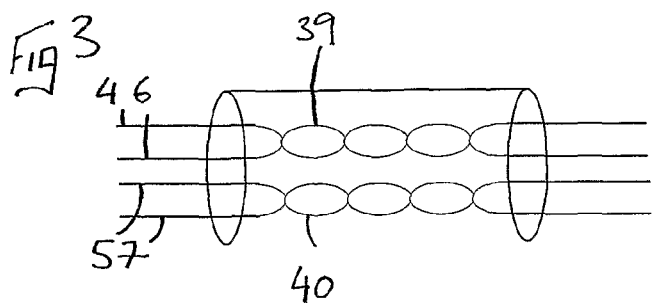
FIG. 3 is a diagrammatic view of a second cable arrangement as used with the electrical circuit of the present invention.

The impedance or characteristic impedance may differ with the different arrangements shown in FIGS. 2 and 3, and the configuration used can be chosen according to its compatibility with the chosen communications format.

The processors 17 and 18 are adapted to re-connect the power supply 2 to the cables 4-7 a pre-determined time after it has been isolated therefrom in use. This arrangement allows an event in the circuit 1 to be identified in safety. In particular, the processors 17 and 18 can isolate the power supply from the cables 4-7 as soon as any event is detected, then discern the nature of the event when the power 2 is reconnected. If the current measurement in each line 4-7 exhibits a common mode or equal rate of change indicative of a load demand or balanced charging components, then the power remains connected, however, should the current change be unbalanced, which would be indicative of a cable fault, then the power 2 will be isolated again. This process can repeat cyclically until the cable fault has been cleared.

One problematic area to be considered is where connectors are used to couple the cable to the load 3. At disconnection, two circuits may be disconnected at the same time, which may lead to two simultaneous incendive arcs, exhibiting the same resistive characteristics. Should this be the case, then the two arcs could be misinterpreted as a common load change, and therefore, the power supply 2 will not be safely isolated.

To avoid this occurrence the pair of positive cables 4 and 5 and the pair of negative cables 6 and 7 are provided with a connector (not shown) at one end comprising two pins, one for each cable, and the two pins are different lengths. With this arrangement, upon disconnection/connection there will always be an unbalance indicative of a fault, and as such the processors 17 and 18 will react or shutdown until both the pins have made and all faults are cleared.

The electrical circuit 1 shown in FIG. 1 can be altered without departing from the scope of claim 1.

In particular, it will be appreciated that is it possible to modulate the power for communications in other ways, provided this is done in the common positive or negative parts of the circuit. in one alternative embodiment (not shown) the first and second modulation means comprise inductive couplings to an isolation reactor functioning as a lone impedance means.

In addition, it is not strictly necessary to use balanced inductive reactors 22 and 23. Therefore, in another alternative embodiment (not shown) the impedance means comprises a single inductive reactor in either the common positive section, or in the common negative section.

It will be appreciated that the electrical circuit of the invention can be used as an intrinsically safe communications circuit only, which basically uses the invention of WO2007/088387 to provide intrinsic safety. Therefore, in another alternative embodiment (not shown) the second modulation means comprises the only load, and the electrical circuit is not used for power distribution.

As referred to above, the incendive arc prevention means 8 can be any of the alternative constructions disclosed in WO2007/088387. Therefore, in one alternative construction (not shown) the first sensor coil and the second sensor coil are fed to window comparators adapted to drive a first isolation means adapted to fully or partially isolate the power supply from the pair of positive cables and the pair of negative cables if signals are received from the first sensor coil or the second sensor coil. Likewise, the third sensor coil and the fourth sensor coil are fed to window comparators adapted to drive a second isolation means adapted to fully or partially isolate the load from the first pair of positive cables and the first pair of negative cables if signals are received from the third sensor coil or the fourth sensor coil.

It will be appreciated that there are several other ways that the pairs of cables can be monitored in order to detect a difference occurring between them. For example, in another alternative embodiment (not shown) the monitoring means is adapted to separately monitor the current and/or voltage in both the positive cables and both the negative cables in order to discern if the current and/or the voltage of one of the first pair of positive cables, or one of the first pair of negative cables, deviates from the other. Such separate monitoring can be achieved with reactors in the known way.

As an alternative to this arrangement, in a further alternative embodiment (not shown) the monitoring means is adapted to separately monitor the current and/or voltage in one of the positive cables, in one of the negative cables, and in at least one of the common positive section, the common negative section, the load end common positive section or the load end common negative section. The control means is adapted to fully or partially isolate the power supply from the pair of positive cables and the pair of negative cables if the current and/or voltage in the one positive cable or the one negative cable deviates from substantially half the current and/or voltage in the common positive section, the common negative section, the load end common positive section or the load end common negative section, whichever is monitored. This arrangement reduces the number of monitoring points required to three.

In the last two described alternative embodiments each of the pair of positive cables is provided with a diode at its load end, and each of the pair of negative cables is provided with a diode at its load end. This arrangement prevents reverse current injection from any inductive and/or capacitive load or other energy storing load, which effectively isolates each line from each other for detection purposes.

It will be appreciated that the electrical circuit 1 can incorporate further pairs of cables to increase capacity. Therefore, in other alternative embodiments (not shown) one or more second pairs of parallel positive cables are provided between the power supply and the load, and one or more second pairs of parallel negative cables are provided between the load and the power supply. Monitoring processors like processors 17 and 18, are adapted to monitor all the cables and isolate them as necessary in use.

In one alternative embodiment (not shown) when these monitoring processors detect that the current and/or voltage of one of any of the pairs of cables deviates from the other, they can fully or partially isolate the power supply from that pair of cables and its corresponding opposite polarity pair of cables only. As such, if a fault occurs in the primary power cables of an Ethernet cable, then the power can be maintained to the signal/phantom power cables, and visa versa. In a different alternative embodiment (not shown) the monitoring processors can fully or partially isolate the power supply from all the cables.

In these alternative embodiments with multiple pairs of positive and negative cables, the electrical circuits are provided with connectors comprising pins from two or more positive cables and two or more negative cables, and the pins from the two or more positive cables are grouped together, and the pins from the two or more negative cables are grouped together. Such an arrangement reduces the possibility of incendive arcing because no incendive arc can form between pins of the same polarity.

Therefore, the present invention provides a very efficient and high capacity intrinsically safe power distribution and communications circuit.

The invention claimed is:

1. An electrical circuit comprising a power supply, a load, a pair of parallel positive cables between the power supply and the load, a pair of parallel negative cables between the load and the power supply, and incendive arc prevention means,
   in which the incendive arc prevention means comprises monitoring means adapted to monitor the pair of positive cables and the pair of negative cables, and to detect if the current and/or voltage in one of the pair of positive cables deviates from the other, and if the current and/or voltage in one of the pair of negative cables deviates from the other,
   and in which the incendive arc prevention means comprises a control means adapted to fully or partially isolate the power supply from the pair of positive cables and the pair of negative cables if the monitoring means detects that the current and/or voltage of one of the pair of positive cables has deviated from the other, or if the current and/or voltage of one of the pair of negative cables has deviated from the other, characterised in which:
   the electrical circuit comprises a common positive section between the power supply and the pair of positive cables, and a common negative section between the pair of negative cables and the power supply, in which a first modulation means is provided in the common positive section or the common negative section, in which impedance means is provided between the power supply and the first modulation means, and in which the first modulation means is adapted to generate a modulated communications signal.

2. An electrical circuit as claimed in claim 1 in which the electrical circuit comprises a load end common positive section between the pair of positive cables and the load, and a load end common negative section between the load and the pair of negative cables, in which a second modulation means is provided in the load end common positive section or the load end common negative section, and in which the second modulation means is adapted to demodulate said modulated communications signal.

3. An electrical Circuit as claimed in claim 2 in which the second modulation means is adapted to generate a return modulated communications signal, and in which the first modulation means is adapted to demodulate said return modulated communications signal.

4. An electrical circuit as claimed in claim 3 in which the second modulation means comprises said load, and the electrical circuit is only for the purpose of communication.

5. An electrical circuit as claimed in claim 3 in which the load comprises one or more field devices, and in which the electrical circuit provides power for said one or more field devices.

6. An electrical circuit as claimed in claim 4 in which the impedance means is provided in the common positive section.

7. An electrical circuit as claimed in claim 4 in which the impedance means is provided in the common negative section.

8. An electrical circuit as claimed in claim 4 in which the impedance means comprises a first impedance means in the common positive section, and a second impedance means in the common negative section.

9. An electrical circuit as claimed in claim 8 in which the first impedance means and the second impedance means comprise balanced inductive reactors.

10. An electrical circuit as claimed in claim 9 in which the first modulation means comprises a capacitor coupled modulator mounted across the circuit between the common positive section and the common negative section, and in which the second modulation means comprises a capacitor coupled modulator mounted across the circuit between the load end common positive section and the load end common negative section.

11. An electrical circuit as claimed in claim 2 in which the electrical circuit is adapted to carry DSL signals, and in which the first modulation means and the second modulation means communicate with one another according to the DSL protocol.

12. An electrical circuit as claimed in claim 3, in which the electrical circuit is provided with media converters adapted to convert the modulated communications signal and/or said return modulated communications signal into other media for transmission to associated devices with which the electrical circuit is used, and to convert incoming signals from said associated devices in other media into the modulated communications signal and/or the return modulated communications signal, and in which the media converts are adapted to convert the modulated communications signal and/or the return modulated communications signal to and from any one or more of the following other media: Ethernet, Power over Ethernet (PoE), Fieldbus, Radio, 4-20mA digital I/O, HART, RTD, T/C, Strain Gauge, Modbus or Optical.

13. An electrical circuit as claimed in claim 12 in which the pair of positive cables are formed into a first twisted pair, in which the pair of negative cables are formed into a second twisted pair, and in which the first twisted pair and the second twisted pair are bundled together in the same outer cable.

14. An electrical circuit as claimed in claim 13 in which a first positive cable and a first negative cable are formed into a first twisted pair, in which a second positive cable and a second negative cable are formed into a second twisted pair, and in which the first twisted pair and the second twisted pair are bundled together in the same outer cable.

15. An electrical circuit as claimed in claim 1 in which the monitoring means comprises inductive reactors situated at both ends of each of the pair of positive cables, and at both ends of each of the pair of negative cables, in which the two inductive reactors at a first end of the pair of positive cables share a first common core, in which the two inductive reactors at a first end of the pair of negative cables share a second common core, in which the two inductive reactors at a second end of the pair of positive cables share a third common core, and in which the two inductive reactors at a second end of the pair of negative cables share a fourth common core.

16. An electrical circuit as claimed in claim 15 in which the two inductive reactors at the first end of the pair of positive cables are wound around the first common core in opposite directions, in which the two inductive reactors at the first end of the pair of negative cables are wound around the second common core in opposite directions, in which the two inductive reactors at the second end of the pair of positive cables are wound around the third common core in opposite directions, and in which the two inductive reactors at the second end of the pair of negative cables are wound around the fourth common core in opposite directions.

17. An electrical circuit as claimed in claim 16 in which the monitoring means comprises a first sensor coil wound round the first common core, a second sensor coil wound round the second common core, a third sensor coil would round the third common core and a fourth sensor coil would round the fourth common core.

18. An electrical circuit as claimed in claim 17 in which the first sensor coil and the second sensor coil are fed to a first processor adapted to drive a first isolation means adapted to fully or partially isolate the power supply from the pair of positive cables and the pair of negative cables if signals are received from the first sensor coil or the second sensor coil, and in which the third sensor coil and the fourth sensor coil are fed to a second processor adapted to drive a second isolation means adapted to fully or partially isolate the load from the first pair of positive cables and the first pair of negative cables if signals are received from the third sensor coil or the fourth sensor coil.

19. An electrical circuit as claimed in claim 17 in which the first sensor coil and the second sensor coil are fed to window comparators adapted to drive a first isolation means adapted to fully or partially isolate the power supply from the pair of positive cables and the pair of negative cables if signals are received from the first sensor coil or the second sensor coil, and in which the third sensor coil and the fourth sensor coil are fed to window comparators adapted to drive a second isolation means adapted to fully or partially isolate the load from the first pair of positive cables and the first pair of negative cables if signals are received from the third sensor coil or the fourth sensor coil.

20. An electrical circuit as claimed in claim 18 in which the first isolation means comprises an isolating element between the power supply and the pair of positive cables and the pair of negative cables, and in which the second isolation means comprises an isolating element between the load and the pair of positive cables and the pair of negative cables.

21. An electrical circuit as claimed in claim 20 in which all the inductive reactors are provided with resistive shunts.

22. An electrical circuit as claimed in any of claim 1 in which monitoring means is adapted to separately monitor the current and/or voltage in both the pair of positive cables and both the pair of negative cables in order to discern if the current and/or the voltage of one of the pair of positive cables, or one of the pair of negative cables, deviates from the other.

23. An electrical circuit as claimed in claim 2 in which the monitoring means is adapted to separately monitor the current and/or voltage in one of the pair of positive cables, in one of the pair of negative cables, and at least one of the common positive section, the common negative section, the load end common positive section or the load end common negative section, and in which the control means adapted to fully or partially isolate the power supply from the first pair of positive cables and the first pair of negative cables if the current and/or voltage in the one positive cable or the one negative cable deviates from substantially half the current and/or voltage in the common positive section, the common negative section, the load end common positive section or the load end common negative section, whichever is monitored.

24. An electrical circuit as claimed in claim 22 in which each of the pair of positive cables is provided with a diode at its load end, and in which each of the pair of negative cables is provided with a diode at its load end.

25. An electrical circuit as claimed in claim 1 in which the control means is adapted to re-connect the power supply to the pair of positive cables and the pair of negative cables a pre-determined time after it has been isolated therefrom in use.

26. An electrical circuit as claimed in claim 1 in which the pair of positive cables and/or the pair of negative cables is provided with a connector at one end comprising two pins, one for each cable, and in which the two pins are different lengths.

* * * * *